United States Patent [19]

Brim

[11] Patent Number: 5,022,420

[45] Date of Patent: Jun. 11, 1991

[54] LAWN MOWER SHADE APPARATUS

[76] Inventor: Walter L. Brim, 2825 S. Washington Ave. #256, Titusville, Fla. 32780

[21] Appl. No.: 554,566

[22] Filed: Jul. 19, 1990

[51] Int. Cl.⁵ ............................................. E04H 15/06
[52] U.S. Cl. ...................................... 135/88; 56/17.4; 56/DIG. 9; 280/47.38; 297/184
[58] Field of Search ...................... 135/88, 90, 96, 120; 56/16.7, 17.4, 14.7, DIG. 20, DIG. 24, DIG. 9; 280/47.38; 297/184

[56] References Cited

U.S. PATENT DOCUMENTS

| | | | |
|---|---|---|---|
| 2,641,770 | 6/1953 | Chapin | 135/88 X |
| 2,715,044 | 8/1955 | Neidetcher | 135/88 X |
| 2,747,653 | 5/1956 | Obradavich | 297/184 X |
| 2,752,929 | 7/1956 | Berger | 135/90 X |
| 3,243,230 | 3/1966 | Otto | 135/90 X |
| 3,333,595 | 8/1967 | Bannister et al. | 135/120 X |
| 3,334,909 | 8/1967 | Smith et al. | 280/47.38 X |
| 3,716,975 | 2/1973 | Smith | 56/17.4 |
| 3,873,117 | 3/1975 | Perego | 280/47.38 X |
| 3,879,086 | 4/1975 | Moceri | 297/184 |
| 4,037,614 | 7/1977 | Hines et al. | 297/184 X |
| 4,112,957 | 9/1978 | Biven | 297/184 X |
| 4,389,057 | 6/1983 | Richard, Jr. | 135/90 X |
| 4,635,667 | 1/1987 | Harn | 135/90 |
| 4,639,036 | 1/1987 | Nichols | 297/184 |
| 4,641,883 | 2/1987 | Kato | 297/184 |
| 4,643,479 | 2/1987 | Servi | 297/184 |
| 4,781,411 | 1/1988 | Kolb | 297/184 |
| 4,865,381 | 9/1989 | Van Rogve | 297/184 |
| 4,924,896 | 5/1990 | Carter | 135/90 |

FOREIGN PATENT DOCUMENTS

| | | | |
|---|---|---|---|
| 210079 | 7/1960 | Fed. Rep. of Germany | 135/120 |
| 26544 | of 1896 | United Kingdom | 135/88 |
| 8288 | of 1899 | United Kingdom | 135/88 |

Primary Examiner—Henry E. Raduazo
Assistant Examiner—Lan Mai
Attorney, Agent, or Firm—Leon Gilden

[57] ABSTRACT

Apparatus for providing over head shade protection to an operator of a lawn mower is set forth to include a plurality of spaced U-shaped mounds for securement to handles of an associated lawnmower wherein the mounds telescopingly are associated with support rods, the support rods pivotally mount at each respective end thereof first canopy rods wherein the first canopy rods movably receive U-shaped canopy sliders wherein the organization is formable into a conveniently stored organization and easily errected and secured to the associated lawn mower. Further, the invention includes a storage container secured to the canopy wherein the storage container provides a tethered pair of ear protective devices for use in association with a lawn mower.

1 Claim, 4 Drawing Sheets

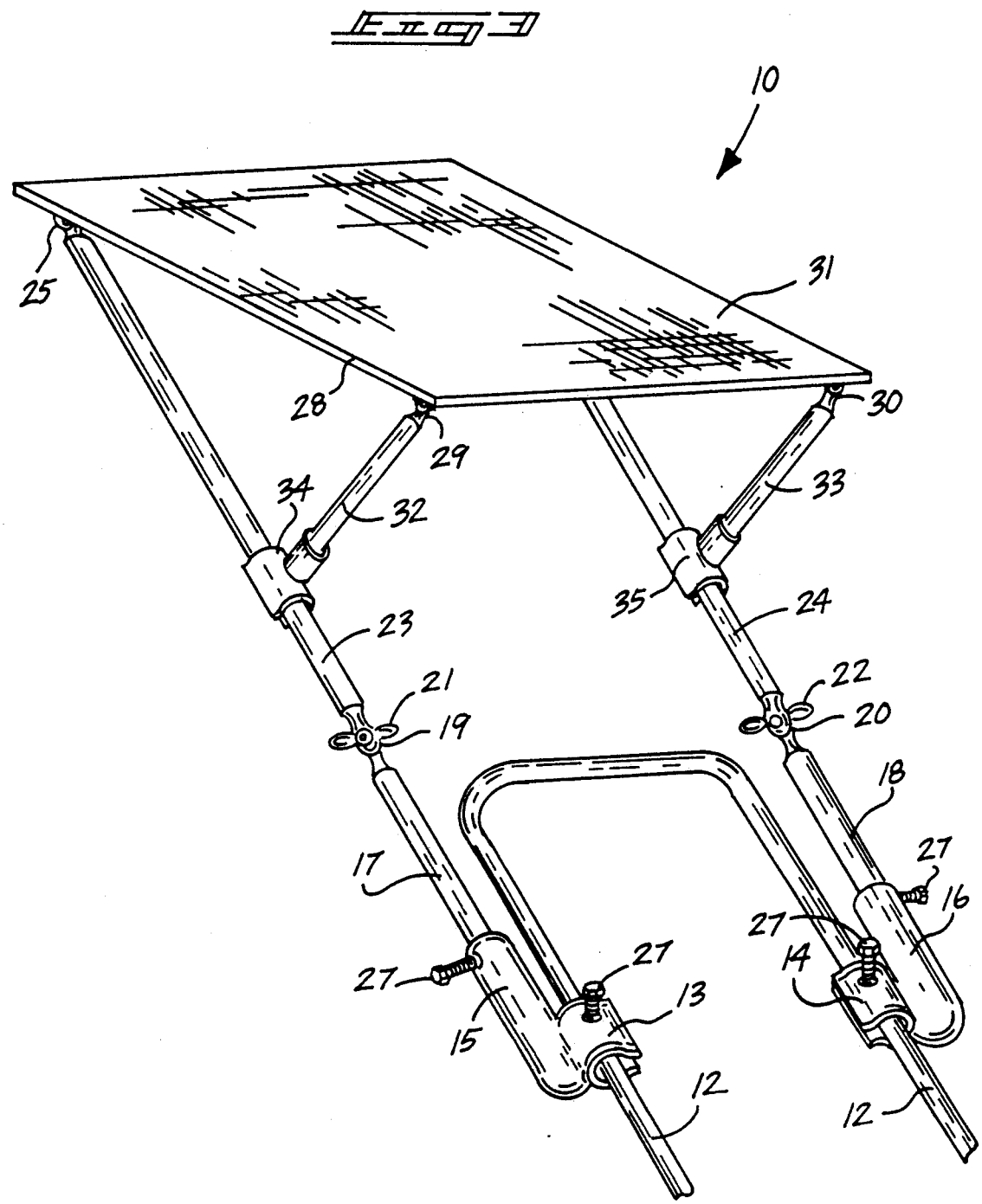

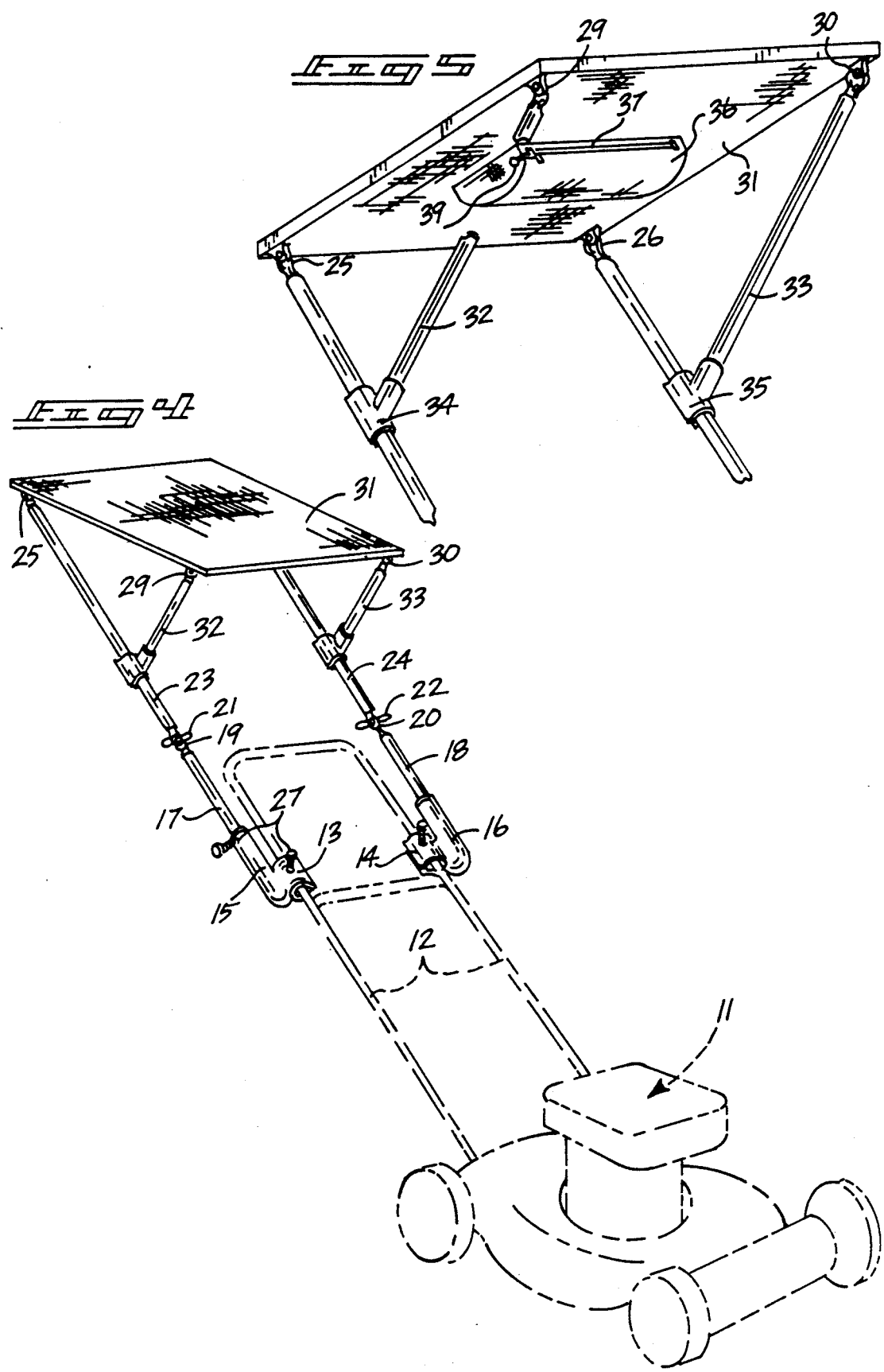

LAWN MOWER SHADE APPARATUS

BACKGROUND OF THE INVENTION

1. Field of the Invention

The field of the invention relates to lawn mower apparatus, and more particularly pertains to a new and improved lawn mower shade apparatus wherein the same provides an organization easily errected and secured to an associated lawn mower to provide over head shade to an operator thereof.

2. Description of the Prior Art

Lawn mowing as is conventional is practiced to a greater degree during a summer season when elevated temperatures and exposure to direct sun rays become a health hazard to many individuals due to unnecessary ultra violet exposure as well as heat exhaustion due to prolonged exposure to direct sunlight during a condition of elevated temperatures.

Prior art structure has been developed to provide shade protection for individuals in various organizations. For example, U.S. Pat. No. 4,037,614 to HINES et al sets forth a canopy for use with a golf cart and the like wherein the canopy is mounted to the framework of an associated golf cart.

U.S. Pat. No. 4,639,036 to NICHOLS sets forth a sun shade apparatus that is arranged for mounting to a lawn chair.

U.S. Pat. No. 4,781,411 to KOLB sets forth a sun shade arranged for securement to a seat such as typically utilized in water craft for example.

U.S. Pat. No. 4,641,883 to KATO sets forth a foldable support that is mounted to a seat arrangement.

U.S. Pat. No. 4,112,957 to BIVEN sets forth a sun shade that is mounted relative to an individual during a back packing procedure as the framework is selectively associated with a back pack to be worn by the individual.

As such, it may be appreciated that there continues to be a need for a new and improved lawn mower shade apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of lawn mower apparatus present in the prior art, the present invention provides a new and improved lawn mower shade apparatus wherein the same provides a readily stored and conveniently errected lawn mower shade structure that is conveniently mounted to an associated lawn mower to provide shade protection to an operator thereof. As such, the general purpose of the present invention, which will be described subsequently in greater detail, is to provide a new and improved lawn mower shade apparatus which has all the advantages of the prior art lawn mower apparatus and none of the disadvantages.

To attain this, the lawn mower shade apparatus of the invention includes apparatus for providing over head shade protection to an operator of a lawn mower is set forth to include a plurality of spaced U-shaped mounds for securement to handles of an associated lawnmower wherein the mounds telescopingly are associated with support rods, the support rods pivotally mount at each respective end thereof first canopy rods wherein the first canopy rods movably receive U-shaped canopy sliders wherein the organization is formable into a conveniently stored organization and easily errected and secured to the associated lawn mower. Further, the invention includes a storage container secured to the canopy wherein the storage container provides a tethered pair of ear protective devices for use in association with a lawn mower.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved lawn mower shade apparatus which has all the advantages of the prior art lawn mower apparatus and none of the disadvantages.

It is another object of the present invention to provide a new and improved lawn mower shade apparatus which may be easily and efficiently manufactured and marketed.

It is a further object of the present invention to provide a new and improved lawn mower shade apparatus which is of a durable and reliable construction.

An even further object of the present invention is to provide a new and improved lawn mower shade apparatus which is susceptible of a low cost of manufacture with regard to both materials and labor, and which accordingly is then susceptible of low prices of sale to the consuming public, thereby making such lawn mower shade apparatus economically available to the buying public.

Still yet another object of the present invention is to provide a new and improved lawn mower shade apparatus which provides in the apparatuses and methods of the prior art some of the advantages thereof, while simultaneously overcoming some of the disadvantages normally associated therewith.

Still another object of the present invention is to provide a new and improved lawn mower shade apparatus which may be compactly stored when not being utilized.

Yet another object of the present invention is to provide a new and improved lawn mower shade apparatus wherein the same provides convenient and portable structure readily mounted to an associated lawn mower.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an isometric illustration of the instant invention.

FIG. 4 is an isometric illustration of the instant invention mounted to an associated lawn mower as illustrated in phantom.

FIG. 5 is an isometric illustration of the instant invention setting forth the storage container mounted to the shade structure.

DESCRIPTION OF THE PREFERRED EMBODIMENT

Figure 1:
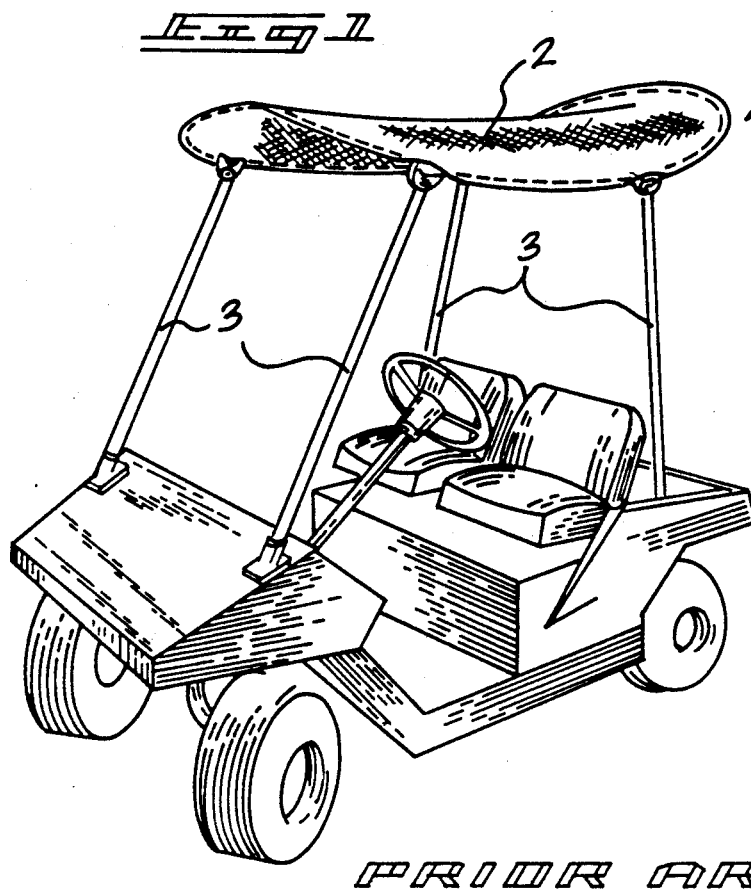
FIG. 1 is an isometric illustration of a prior art shade structure.

With reference now to the drawings, and in particular to FIGS. 1 to 7 thereof, a new and improved lawn mower shade apparatus embodying the principles and concepts of the present invention and generally designated by the reference numeral 10 will be described.

Figure 2:
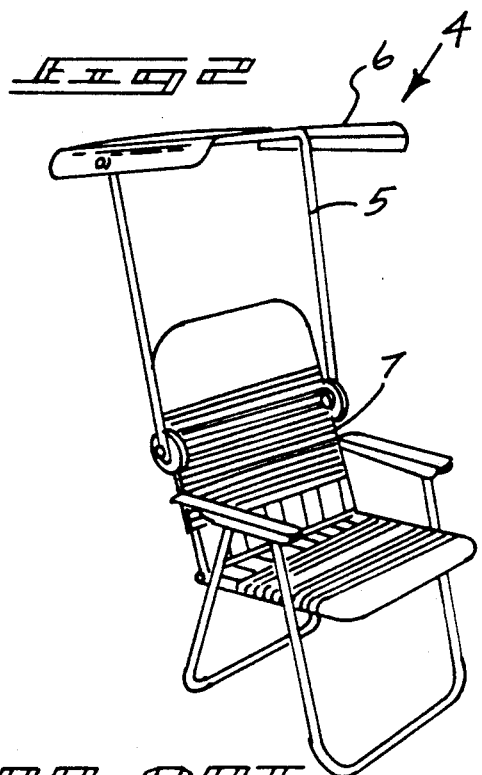
FIG. 2 is an isometric illustration of a further prior art shade structure.

FIG. 1 illustrates a prior art sun canopy organization 1 wherein a canopy 2 is mounted to downwardly extending legs 3 therein mounted to the framework of an associated golf cart. FIG. 2 illustrates a further shade structure 4 wherein overlying shade 6 is mounted to a generally U-shaped framework 5 with downwardly extending legs secured to post sides of an associated lawn chair structure 7.

More specifically, the lawn mower shade apparatus 10 of the instant invention essentially comprises securement to an associated lawn mower 11 (see FIG. 4) wherein the lawn mower includes a plurality of spaced handle rods 12. The shade apparatus includes a first U-shaped mount 13 and a second U-shaped mount 14 each selectively secured about an associated lawn mower handle rod 12 in a manner as illustrated in FIGS. 3 and 4. Each U-shaped mount includes a fastener 27 threadedly directed through one of the legs of the U-shaped mount to fixedly secure and engage a handle rod of the associated lawn mower. The first U-shaped mount 13 includes a first sleeve 15 wherein the second U-shaped mount 14 includes a second sleeve 16. Each of the sleeves 15 and 16 are actually parallel to and offset relative to the respective first and second U-shaped mount 13 and 14 and extend rearwardly thereof. Each sleeve telescopingly receives a respective first and second support rod 17 and 18 therewithin wherein each of the sleeves further includes a fastener 27 diametrically aligned and threadedly directed through each sleeve to fixedly secure a respective support rod at a predetermined spacing within each sleeve. Each rear terminal end of the first and second support rods 17 and 18 includes a respective first and second pivot connection 19 and 20 respectively. The first and second pivot connection 19 and 20 is secured to a forward end of a respective first and second canopy rod 23 and 24. A respective first and second pivot fastener 21 and 22 mounted to each first and second pivot connection 19 and 20 respectively permits tilting or pivotment of each respective first and second canopy rod relative to each first and second pivot to angularly arrange the canopy of the organization relative to an individual positioned thereunder when such individual is pushing the lawn mower by use of its associated handle in a conventional manner. The upper terminal end of each first and second canopy rod 23 and 24 includes a respective third and fourth pivot connection 25 and 26. The pivot connection 25 and 26 is as noted mounted to the upper terminal end of the first and second canopy rod 23 and 24 while simultaneously fixedly secured to rear respective corners of an associated canopy framework 28. The canopy framework 28 includes a fifth and sixth pivot connection 29 and 30 mounted to forward corners of the canopy framework wherein the fifth pivot connection 29 is positioned longitudinally forwardly of the third pivot connection while the sixth pivot connection 30 is arranged longitudinally and forwardly of the fourth pivot connection 26. The canopy framework 28 mounts a canopy 31 thereon. The canopy 31 may be formed of any air permeable fabric as desired. Respective fifth and sixth pivot connections 29 and 30 are respectively mounted to a third and fourth canopy rod 32 and 33 at an upper terminal end of each of the third and fourth canopy rods as illustrated in FIG. 3 for example. The respective lower terminal end of each third and fourth canopy rod 32 and 33 is mounted to an associated respective first and second U-shaped slider 34 and 35 defined by spring bias U-shaped legs that receive the respective first and second canopy rod 23 and 24 therebetween and fixedly secure the respective first and second slider to the respective first and second canopy rod in a manner as illustrated in FIGS. 3 and 4 for example.

Figure 6:
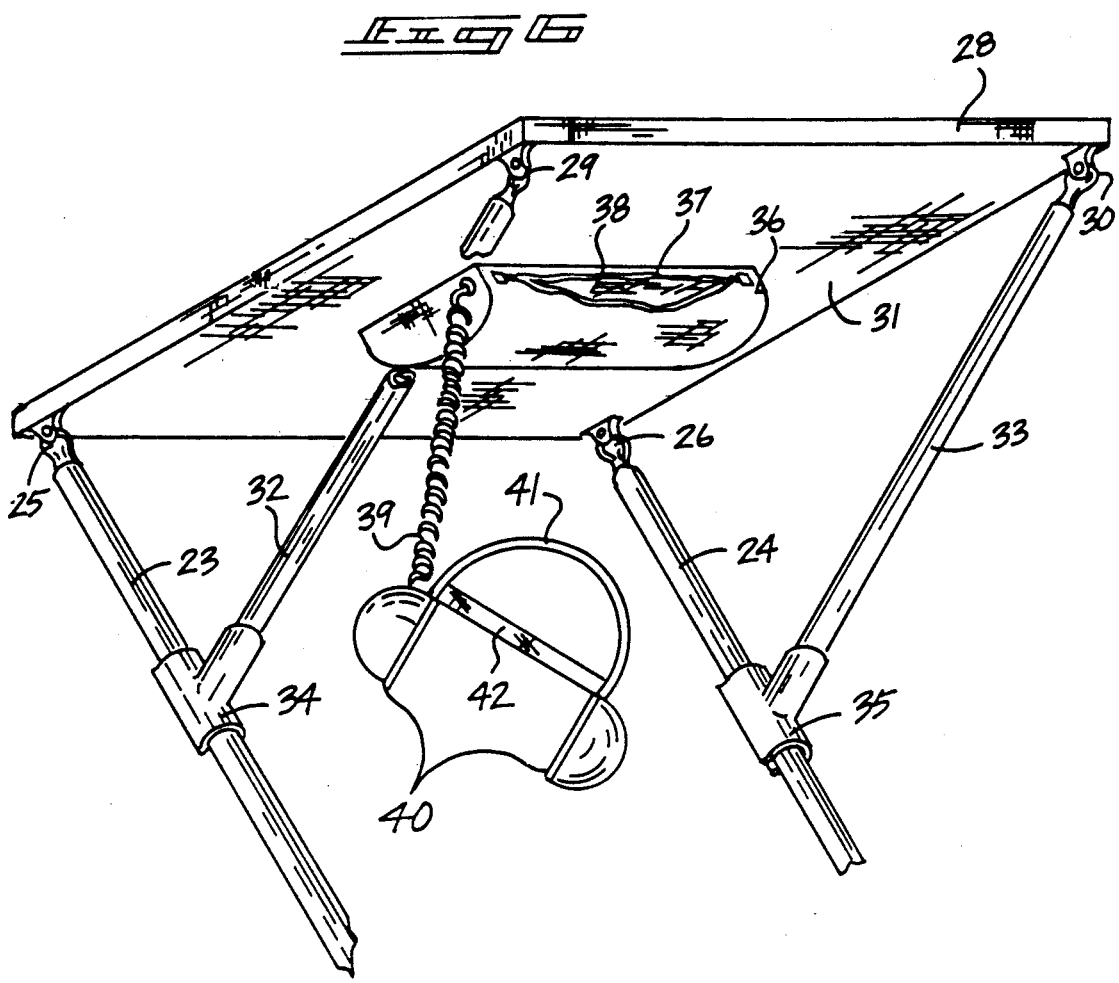
FIG. 6 is an isometric illustration of the instant invention with the ear protector device illustrated in association with the storage container of the instant invention.
Figure 7:
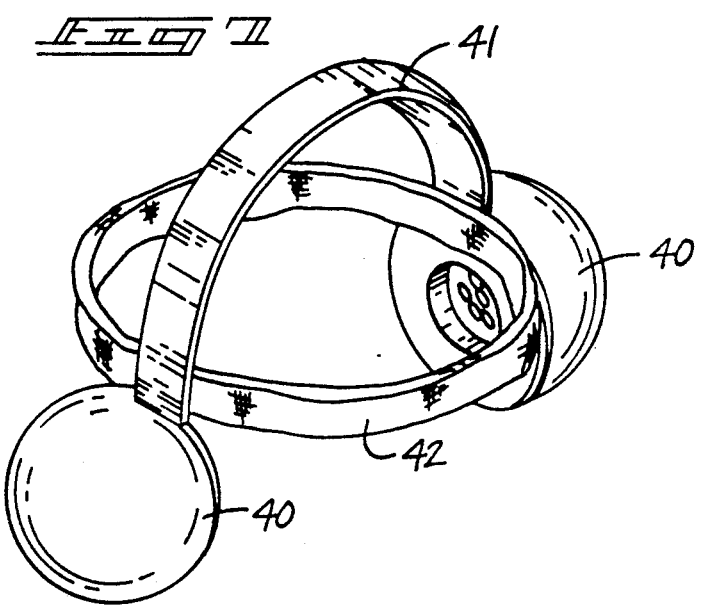
FIG. 7 is an isometric illustration of the ear protector device utilized by the instant invention.

FIGS. 5 and 6 illustrate the use of a storage container 36 fixedly mounted to a bottom surface of the canopy 31. The container 36 includes a zipper 37 mounted coextensively of the longitudinal extent of the container 36 whereupon unfastening of the zipper 37 in a manner as illustrated in FIG. 6 provides access to a pocket cavity 38 within the container 36. An extensible coiled tether line 39 spring type organization is fixedly secured within the pocket cavity 38 at interior end of the tether line 39 and is secured to one of a plurality of ear protector cups 40 at a forward end of the tether line. The ear protector cups 40 are secured adjustably relative to one another by an adjustable U-shaped band 41 of a generally semiannular configuration for positioning upon an individual. The ear protector organization further is provided with a fabric persperation band 42 diametrically secured at opposed lower terminal ends of the band 41 for positioning about an individual for assisting in covering of the individual during use. If acquired, the perspiration band 42 may be selectively secured to the lower terminal ends of the U-shaped band 41 by use of conventional fabric hook and loop fasteners cooperative between the lower terminal ends of the U-shaped band 41 and the presperation band 42.

As to the manner of usage and operation of the instant invention, the same should be apparent from the above disclosure and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A lawn mower shade apparatus in combination with a lawn mower wherein the lawn mower includes spaced handle rods, and
   the apparatus includes a first "U" shaped mount and a second "U" shaped mount with each "U" shaped mount mounted to a respective handle rod of the lawn mower, and
   each "U" shaped mount includes a fastener directed through each first and second "U" shaped mount to secure an associated rod therewithin, and
   the first and second "U" shaped mount each respectively include a respective first and second sleeve, the first and second sleeve arranged coaxially parallel to and offset relative each respective first and second "U" shaped mount, and
   each respective first and second sleeve includes a framework mounted to the first and second sleeve, and
   the framework including a canopy overlying the framework, and
   wherein the framework includes a first and second support rod, the first and second support rod respectively telescopingly received within the first and second sleeve, and the first and second sleeve including a sleeve fastener to selectively secure the first and second support rod relative to the first and second sleeve, and
   wherein the first and second support rod each include a rear terminal and spaced from the respective first and second sleeve, and the rear terminal end of the first support rod includes a first pivot connection and the second support rod includes a second pivot connection mounted to the rear terminal end of the second support rod, and further including a first and second canopy rod with a forward end of the first canopy rod mounted to the first pivot connection and at a forward end of the second canopy rod mounted to the second pivot connection to permit pivotment of the first canopy rod relative to the first support rod and pivotment of the second canopy rod relative to the second support rod, and
   wherein the framework further includes a third pivot connection mounted to a rear terminal end of the first canopy rod and a fourth pivot connection mounted to a rear terminal end of the second canopy rod, and the third pivot connection simultaneously mounted pivotally to the canopy framework wherein the third and fourth pivot connections are mounted to rear corner portions of the canopy framework, and a fifth and sixth pivot connection mounted to forward corner portions of the canopy framework, and a third canopy rod mounted to the fifth pivot connection and a fourth canopy rod mounted to the sixth pivot connection at upper terminal ends of the respective third and fourth canopy rods, and a lower terminal end of the third canopy rod including a first "U" shaped slider, and a lower terminal end of the fourth canopy rod including a second "U" shaped slider, the third "U" shaped slider selectively securable to the second "U" shaped slider selectively securable to the second canopy rod, and
   wherein each "U" shaped slider includes spring biased legs to selectively engage a respective first and second canopy rod by the respective first and second "U" shaped slider, and
   wherein the canopy framework includes a canopy mounted and fixedly secured interiorly of the canopy framework and directed coextensively therewithin.

* * * * *